(12) United States Patent
Mazzon

(10) Patent No.: US 7,992,489 B2
(45) Date of Patent: Aug. 9, 2011

(54) ELECTRIC GRILL FOR THE COOKING OF FOOD PRODUCTS

(75) Inventor: Renzo Mazzon, Silea (IT)

(73) Assignee: De'Longhi S.p.A., Treviso (IT)

( * ) Notice: Subject to any disclaimer, the term of this patent is extended or adjusted under 35 U.S.C. 154(b) by 542 days.

(21) Appl. No.: 12/293,900

(22) PCT Filed: Mar. 14, 2007

(86) PCT No.: PCT/EP2007/002239
§ 371 (c)(1),
(2), (4) Date: Sep. 22, 2008

(87) PCT Pub. No.: WO2007/118564
PCT Pub. Date: Oct. 25, 2007

(65) Prior Publication Data
US 2009/0120302 A1    May 14, 2009

(30) Foreign Application Priority Data
Mar. 22, 2006  (IT) .............................. MI2006A0525

(51) Int. Cl.
*A47J 37/06* (2006.01)
(52) U.S. Cl. ............... 99/378; 16/250; 16/361; 219/524
(58) Field of Classification Search .................... 99/378; 219/524; 16/250, 361
See application file for complete search history.

(56) References Cited

U.S. PATENT DOCUMENTS

| | | | | |
|---|---|---|---|---|
| 1,609,317 A * | 12/1926 | Smith | .............................. | 99/378 |
| 1,646,727 A * | 10/1927 | Ehrgott | ........................... | 99/378 |
| 1,801,260 A * | 4/1931 | Bersted et al. | .................. | 99/378 |
| 2,009,790 A * | 7/1935 | Shroyer | .......................... | 99/378 |
| 2,099,152 A * | 11/1937 | Walder | ............................ | 99/372 |
| 2,108,298 A | 2/1938 | Scharf | | |
| 2,354,240 A * | 7/1944 | Young et al. | .................... | 99/378 |
| 2,478,529 A * | 8/1949 | Farr et al. | ......................... | 99/378 |
| 4,609,234 A | 9/1986 | Naniwa et al. | | |
| 4,803,918 A * | 2/1989 | Carbon et al. | ................ | 219/524 |
| 6,170,389 B1 | 1/2001 | Brady | | |
| 6,595,114 B1 * | 7/2003 | Endres et al. | ................... | 99/378 |
| 2006/0213373 A1 * | 9/2006 | Fernandez et al. | .............. | 99/349 |
| 2007/0000393 A1 * | 1/2007 | Lam | ................................ | 99/372 |

FOREIGN PATENT DOCUMENTS

| | | |
|---|---|---|
| DE | 2510227 A1 | 9/1976 |
| EP | 0563000 A1 | 9/1993 |
| EP | 0792608 A1 | 9/1997 |
| WO | WO 2005037035 A1 * | 4/2005 |

* cited by examiner

*Primary Examiner* — Stephen F Gerrity
(74) *Attorney, Agent, or Firm* — Volpe and Koenig, P.C.

(57) ABSTRACT

A contact electric grill for the cooking of food products is provided having a base shoulder (2) and a lid shoulder (3) joined to each other by a hinging structure including a rotation pin (4), a slot (5) into which the rotation pin (4) is slid, and a support and passage element (6) from the lid shoulder to the base shoulder of electric connection cables (7) among electric components present in the base and in the lid, operationally connected to the base shoulder and the lid shoulder.

10 Claims, 4 Drawing Sheets

ELECTRIC GRILL FOR THE COOKING OF FOOD PRODUCTS

The present invention refers to an electric grill for the cooking of food products.

In particular, the field of application is that of a "contact"-type electric grill, featuring various cooking positions, in general a first cooking position in which the two plates, the base bearing and the lid bearing of the grill are substantially in contact to quickly grill food such as chops, ribs, chicken, hamburgers, etc., a second cooking position in which the plate borne by the lid is slightly lifted up by the plate borne by the base, for the cooking of food such as pizza, fish slices, toasts, sandwiches, etc., and at least a third cooking position in which the plate borne by the lid is rotated with a rotation higher than 90° in relation to the plate borne by the base in order to double the grilling surface.

One of the drawbacks generally suffered by such apparatuses consists in that the cables suitable for electric connection between the two plates are in general located outside the apparatus and this puts the apparatus at a disadvantage both from an aesthetic point of view and because it requires thorough cleaning or protection against splashes or dirt of another kind which may concern it especially during the cooking.

An object of the present invention is to, therefore, make an electric grill for the cooking of food products which allows eliminating the technical disadvantages of the known art.

Within the scope of this object, an object of the invention is to make an electric grill for the cooking of food products which protects against dirt-causing agents the electric connection cables between the plates during the cooking.

Another object of the invention is to make an electric grill for the cooking of food products which hides from sight the electric connection cables between the plates to give the apparatus a pleasant appearance.

The last but not least object of the invention is to make an electric grill for the cooking of food products which protects against dirt-causing agents the electric connection cables between the plates during the cooking but which, at the same time, remains extremely reliable in terms of operation and simple in terms of structure.

The object, as well as other aims, according to the present invention are achieved by making an electric grill for the cooking of food products characterised in that a base shoulder and a lid shoulder of said grill are joined to each other by a hinging structure comprising a rotation pin, a slot into which said rotation pin is sliding, and a support and passage element from said lid shoulder to said base shoulder of the electric connection cables between electric components present in said base and in said lid, operationally connected to said base shoulder and to said lid shoulder.

Furthermore, other characteristics of the present invention are defined in the following claims.

Further characteristics and advantages of the invention will be more obvious from the description of a preferred but not exclusive embodiment of the electrical grill for the cooking of food products according to the invention, depicted by way of example and not limitation in the accompanying drawings, in which.

Figure 1:
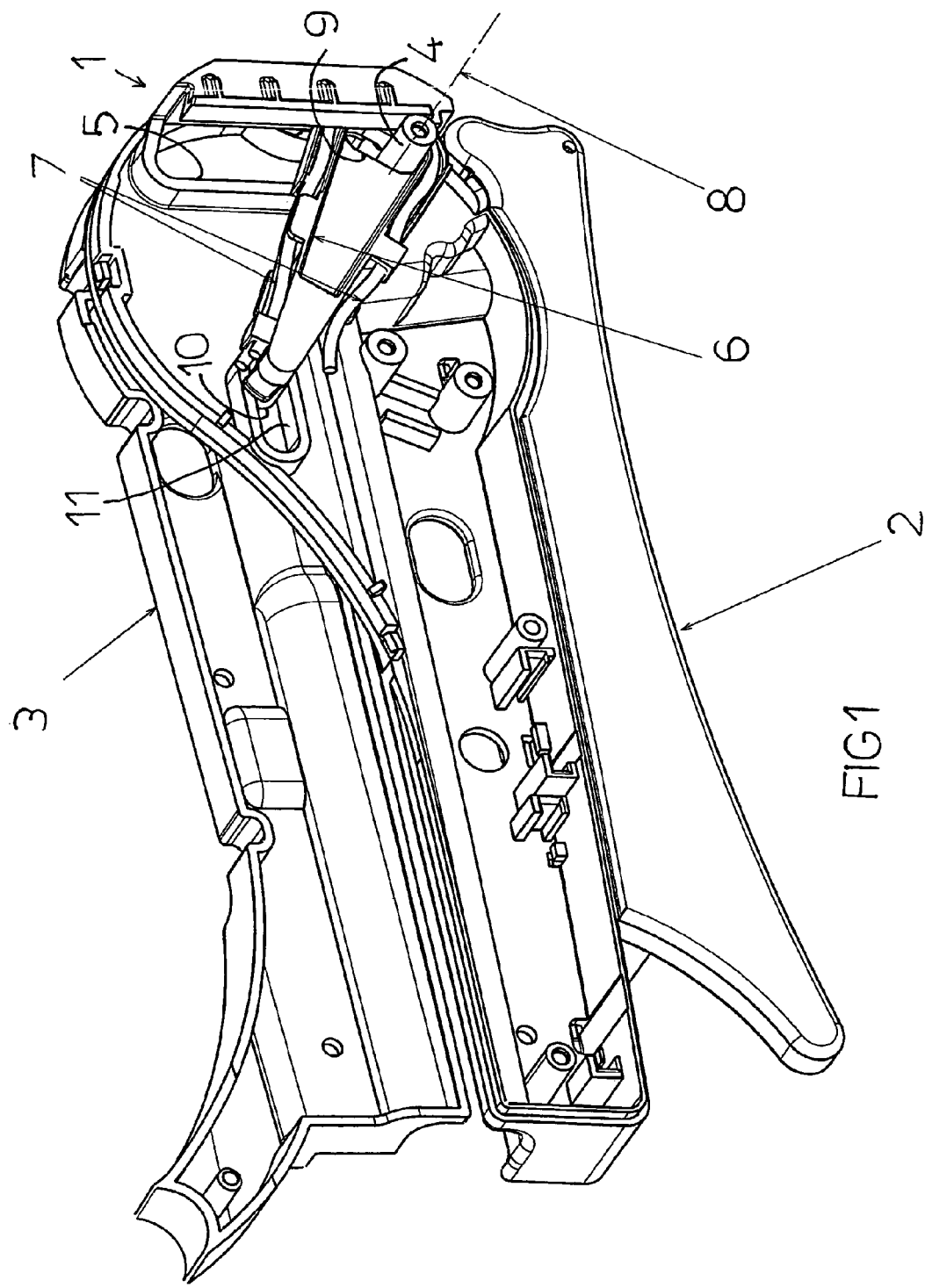
FIG. 1 shows in perspective the hinging structure between a base shoulder (open for viewing comfort) of the grill and a lid shoulder of the grill in the contact cooking position between the cooking plates.
Figure 2:
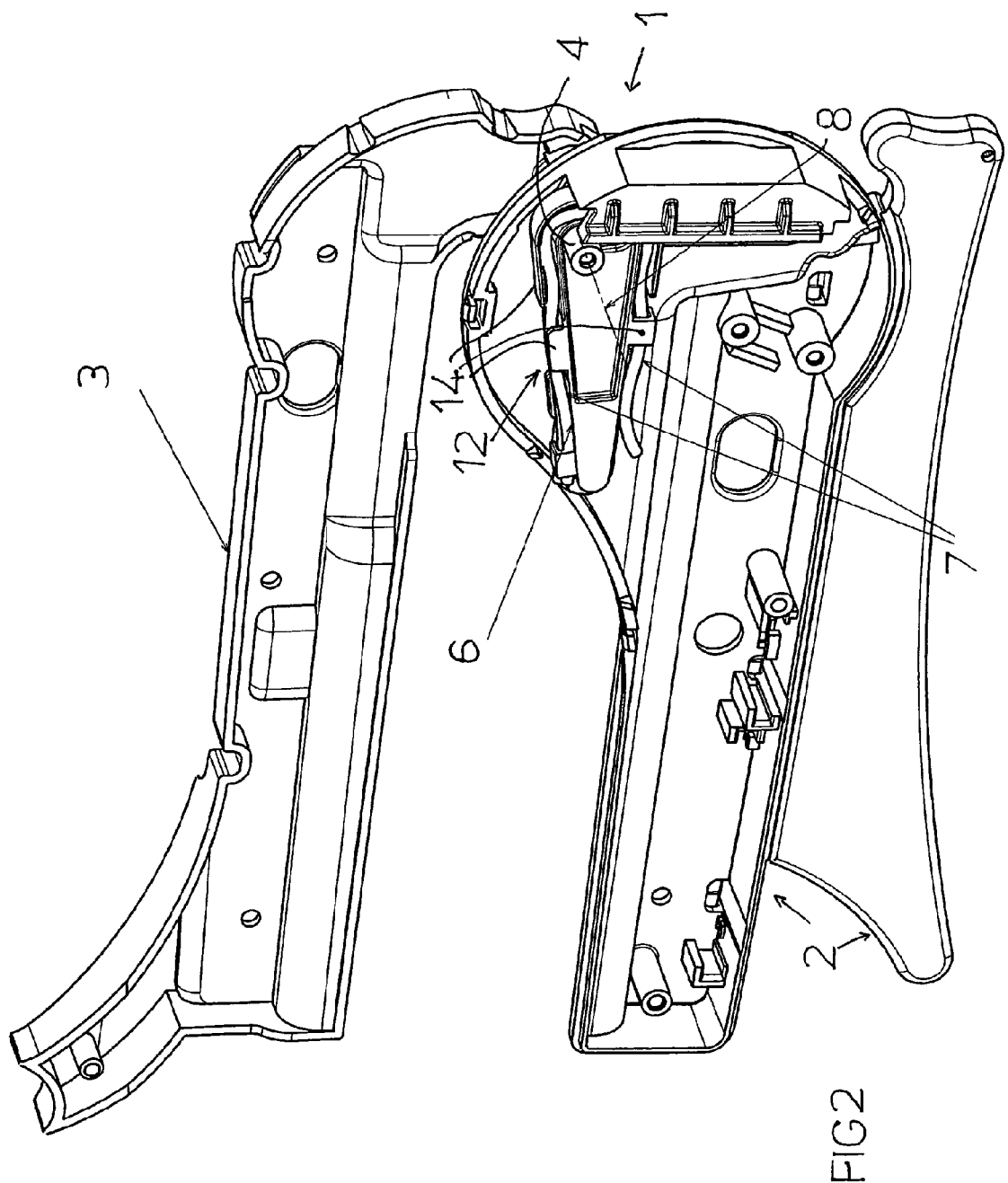
FIG. 2 shows in perspective the hinging structure of FIG. 1 in a different cooking position in which the cooking plates are parallel and slightly spaced apart.
Figure 3:
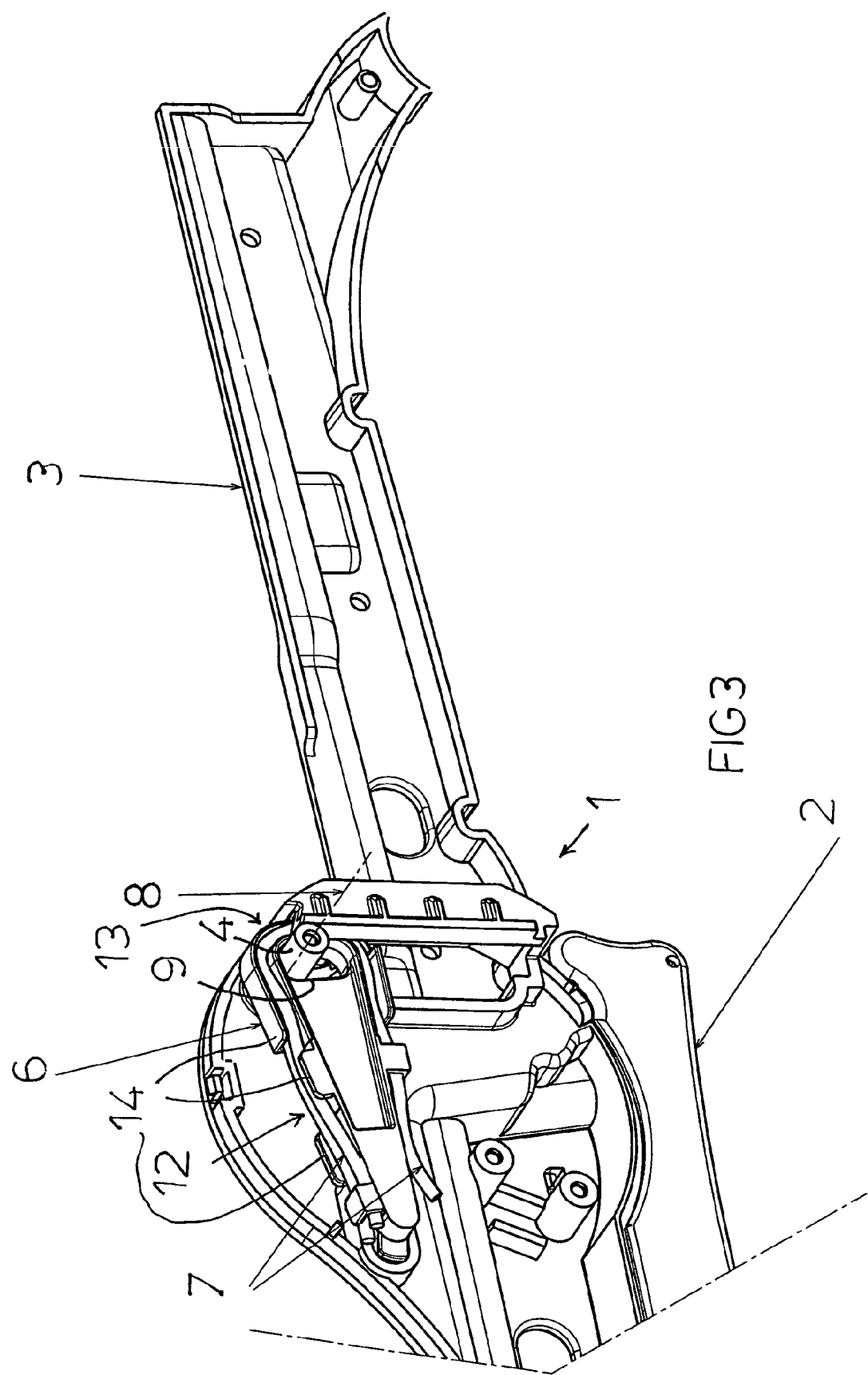
FIG. 3 shows in perspective the hinging structure of FIG. 1 in yet a different cooking position in which the cooking plate borne by the lid is almost upside down in relation to the cooking plate borne by the base in order to double the grilling surface.
Figure 4:
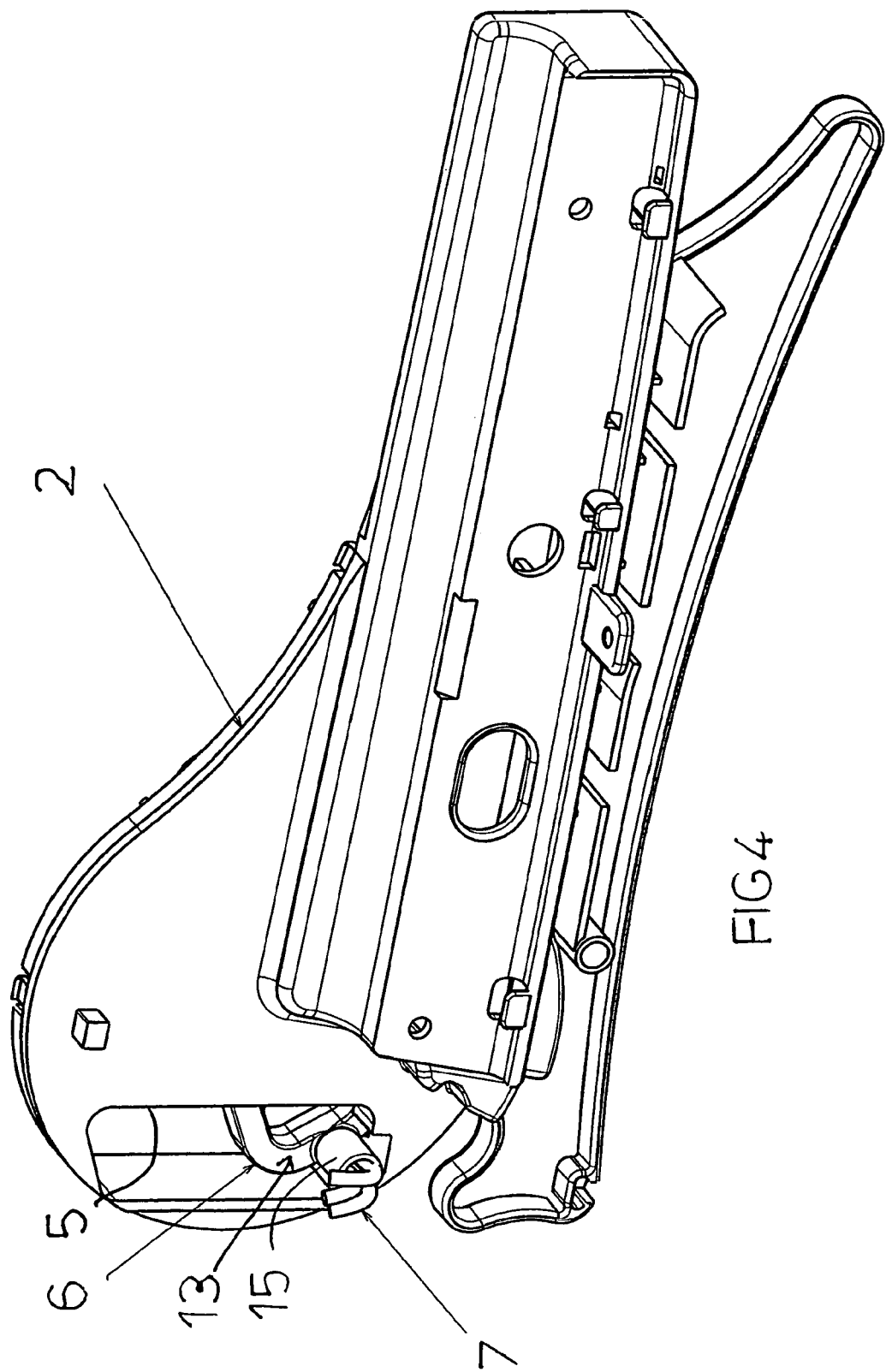

and FIG. 4 shows a perspective view of the opposite side of the base shoulder depicted in FIG. 1.

Referring to the mentioned figures, a hinging structure is shown, indicated overall by reference numeral 1, between a base shoulder 2 and a lid shoulder 3 of an electric grill for the cooking of food products.

The grill in particular is a contact-type one and its base features a pair of support shoulders 2 of a first cooking plate, while its lid features pair of support shoulders 3 of a second cooking plate.

The hinging structure 1 comprises a rotation pin 4, describing in particular a rotation axis 8 orthogonal to the main position plane of the base shoulder 2 and the lid shoulder 3, a slot 5 into which the rotation pin 4 is sliding, and a support and passage element 6 from the lid shoulder 3 to the base shoulder 2 of the electric connection cables 7 between electric components present in the base and the lid of the grill.

The passage element 6 is operationally connected to both the base shoulder 2 and the lid shoulder 3.

Preferably, the rotation pin 4 is present on the lid shoulder 3, the slot 5 is present on the base shoulder 2, and the passage element 6 is present inside the base shoulder 2 which has, as one can see, a box-like configuration.

The operational connection of the passage element 6 to the lid shoulder 3 is achieved by a second slot 9, present on the passage element 6, into which the rotation pin 4 is sliding.

The operational connection of the passage element 6 to the base shoulder 2 is achieved by a second rotation pin 10, present on the passage element 6, sliding into a third slot 11 present in the base shoulder 2.

In a similar manner, in a case not depicted, the second rotation pin 10 and the third slot 11 may present an inverted position on the passage element 6 and in the base shoulder 2.

Advantageously, the passage element 6 features a layout 12 for the placement of the electric cables 7.

The layout 12 circumscribes the second slot 9, and more precisely, extends along the perimeter of the passage element 6.

The layout 12 features at least one of its portions 13 facing the first slot 5 for the passage of the electric cables 7 to the lid shoulder 3 directly through the first slot 5.

The layout 12 comprises shaped elements 14 for holding the cables 7, projecting from the perimeteral edge of the passage element 6.

The shaped elements 14 extend inside the extension of the main faces of the passage element 6 in order not to add extra thickness.

The portion 13 of the layout 12 comprises a tubular element 15 orthogonal to the main position plane of the passage element 6, through which the cables 7 are inserted to be deflected by a position plane parallel to a position plane orthogonal to the main position plane of the passage element 6.

The passage element 6 is actually preferably a plate extending along a preferential extension axis.

Such plate is operationally connected to the base shoulder 2 and to the rotation pin 4 exactly at its most distant ends along its preferential extension axis.

The operation of the hinging structure 1 according to the invention appears obvious from what is described and depicted.

In practice, the various operational positions of the grill are achieved by the movement of the lid shoulder 3 which is capable of both rotating about the rotation axis 8 and translating vertically along the first slot 5 which in fact extends in vertical.

During the rototranslation of the lid shoulder 3, the rotation pin 4, thanks to its engagement into the second slot 9, moves the passage element 6 and the part of the cables 7 supported by the latter so that these reposition themselves while conveniently adjusting to each operational position of the grill.

The thus conceived electric grill allows laying the electric cables in a hidden and protected position through the inside of the hinging structure 1 and thus achieves the pre-established objectives without making the structure of the grill and/or its operation mode more complex.

The thus conceived electric grill is subject to numerous modifications and variations, all of which fall under the scope of the inventive concept; furthermore, all details may be replaced by technically equivalent elements.

In practice, all materials used, as well as the dimensions, may be anything depending on needs and on the state of the art.

The invention claimed is:

1. Electric grill for the cooking of food products comprising a base and a lid, a base shoulder and a lid shoulder of said grill being joined to each other by a hinging structure comprising a rotation pin, a first slot into which said rotation pin is sliding, and a support and passage element from said lid shoulder to said base shoulder of electric connection cables between electric components present in said base and in said lid, operationally connected to said base shoulder and to said lid shoulder, said passage element having a second slot into which said rotation pin is sliding, said passage element featuring a layout for the placement of said electric cables, said layout circumscribing said second slot.

2. Electric grill according to claim 1, wherein said rotation pin is present on said lid shoulder, said first slot is present on said base shoulder and said passage element is present inside said base shoulder.

3. Electric grill according to claim 1, wherein said passage element is operationally connected to said base shoulder through said rotation pin present on said passage element, sliding into a third slot present on the base shoulder.

4. Electric grill according to claim 1, wherein said passage element is operationally connected to said base shoulder through a third slot, present on said passage element, into which a second rotation pin present in said base shoulder is slide.

5. Electric grill according to claim 1, wherein said layout extends along the perimeter of said passage element.

6. Electric grill according to claim 1, wherein said layout features at least one of its portions facing said first slot for the passage of said electric cables to said lid shoulder through said first slot.

7. Electric grill according to claim 1, wherein said layout comprises shaped elements for holding said cables, projecting from the perimeteral edge of said passage element.

8. Electric grill according to claim 7, wherein said portion of said layout comprises a tubular element orthogonal to the main position plane of said passage element, through which said cables are inserted to be deflected by a position plane parallel to a position plane orthogonal to the main position plane of said passage element.

9. Electric grill according to claim 1, wherein said passage element is a plate extending along a preferential extension axis.

10. Electric grill according to claim 9, wherein said plate is operationally connected to said base shoulder and to said rotation pin at its most distant ends.

* * * * *